United States Patent [19]

Hand et al.

[11] Patent Number: 4,784,086
[45] Date of Patent: Nov. 15, 1988

[54] METHOD AND APPARATUS FOR PREVENTING INSECTS FROM ENTERING THE FOOD AREA OF AN ANIMAL FEEDING BOWL

[76] Inventors: Herbert H. Hand, 233 Tram Rd., Columbia, S.C. 29210; Herbert G. Hand, Rte. 2, Box 56A, Gaston, S.C. 29053

[21] Appl. No.: 133,171

[22] Filed: Dec. 11, 1987

Related U.S. Application Data

[63] Continuation-in-part of Ser. No. 914,335, Oct. 2, 1986, abandoned.

[51] Int. Cl.⁴ ............................................... A01K 5/01
[52] U.S. Cl. ..................................................... 119/61
[58] Field of Search .................. 119/61; D30/129, 130

[56] References Cited

U.S. PATENT DOCUMENTS

| | | |
|---|---|---|
| 1,221,999 | 4/1917 | Kreiter . |
| 2,191,811 | 2/1940 | Trampier, Jr. . |
| 2,258,317 | 10/1941 | Clipper . |
| 2,315,989 | 4/1943 | Tennison et al. . |
| 2,554,086 | 5/1951 | Black ................................. 119/61 X |
| 2,584,301 | 2/1952 | Sinclair ................................ 119/61 |
| 2,667,350 | 5/1954 | Prestidge et al. ...................... 119/61 |
| 2,677,350 | 5/1954 | Prestige et al. ........................ 119/61 |
| 2,796,042 | 6/1957 | Cope .................................. 119/61 X |
| 2,813,509 | 11/1957 | Bruno ................................. 119/61 X |
| 3,147,739 | 9/1964 | Shaheen ............................. 119/61 X |
| 3,195,510 | 7/1965 | Berntstein .............................. 119/61 |
| 3,441,003 | 4/1969 | DuMond et al. ....................... 119/61 |
| 3,722,476 | 3/1973 | Van Ness et al. .................... 119/61 |
| 3,995,595 | 12/1976 | Williams ............................... 119/61 |
| 4,128,080 | 12/1978 | Haney ............................... 119/61 X |
| 4,328,636 | 5/1982 | Johnson ................................ 43/107 |
| 4,357,905 | 11/1982 | Carpenter ............................. 119/61 |
| 4,399,772 | 8/1983 | Salines ............................... 119/61 X |

Primary Examiner—Robert P. Swiatek
Attorney, Agent, or Firm—McAndrews, Held & Malloy

[57] ABSTRACT

An animal feeding bowl for placement on the ground in which ants or other crawling insects are prevented from entering the food area of the bowl. A combination of tactic barriers are positioned with respect to the path of travel of the insect from ground to the food area.

9 Claims, 3 Drawing Sheets

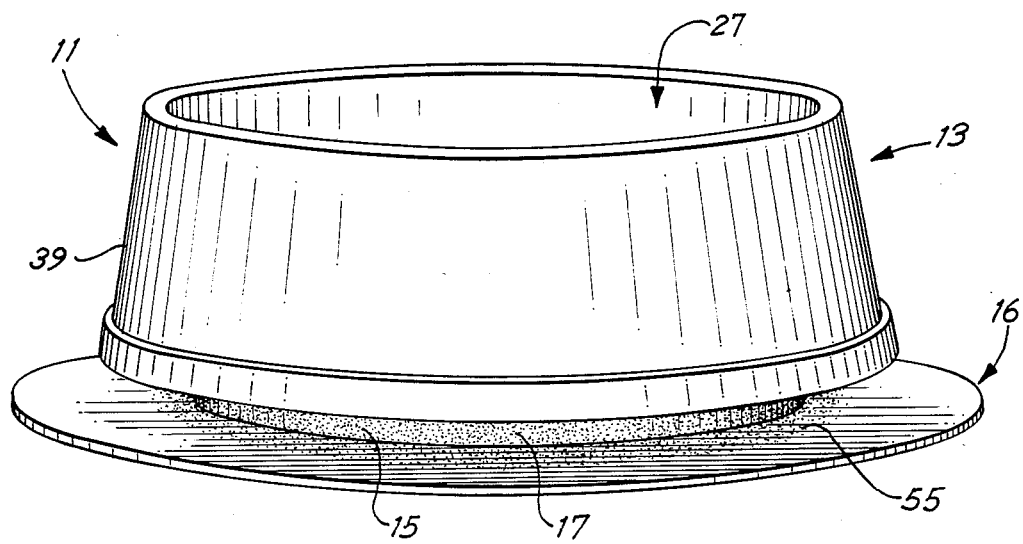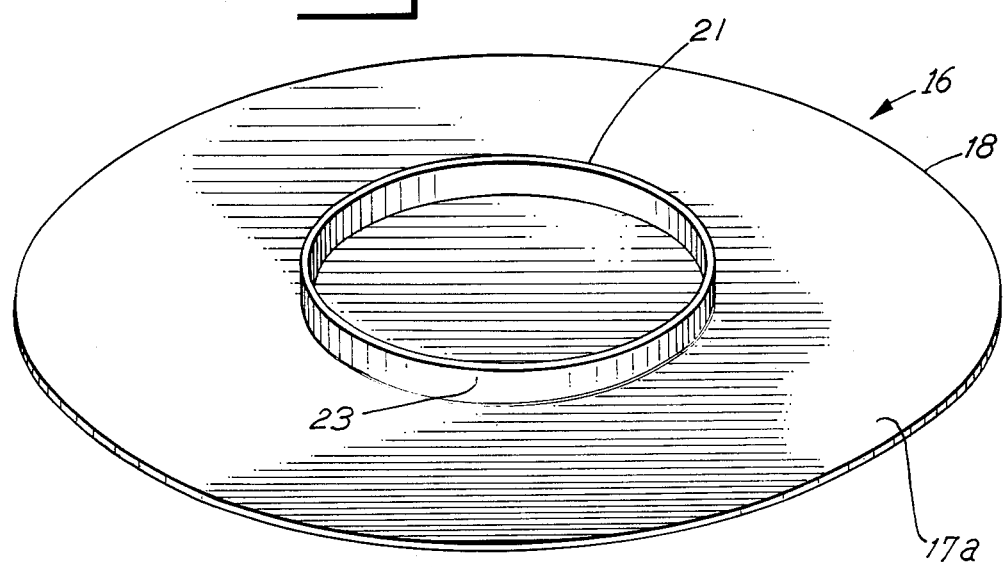

4,784,086

METHOD AND APPARATUS FOR PREVENTING INSECTS FROM ENTERING THE FOOD AREA OF AN ANIMAL FEEDING BOWL

This application is a continuation-in-part of application Ser. No. 914,335, filed Oct. 2, 1986, now abandoned.

BACKGROUND OF THE INVENTION

The invention relates to an animal feeding device and more particularly to a method and apparatus for preventing ants or other crawling insects from entering the food area of an animal feeding bowl.

Heretofore, animal feeding dishes for holding food, water, or the like, utilize a moat obstacle across the pathway leading to the food area to prevent crawling insects from reaching the food.

With such devices, the user must constantly maintain the liquid level in the moat. If a liquid insecticide is used in the moat, the person handling the feeding device must be careful to keep from exposing the fingers to direct contact with the insecticide. Also, if insecticide is used, the moat must be positioned in an area where the animal using the device cannot lick or drink the insecticide.

Therefore, it is an object of the present invention to provide a feeding bowl assembly having physical barriers arranged in a particular manner for preventing crawling insects from reaching the food within the bowl portion of the device.

It is a further object of the present invention to provide a feeding bowl assembly having an aesthetically pleasing appearance while having physical barriers for preventing crawling insects from reaching the food within the bowl portion of the device.

It is yet another object of the present invention to provide a feeding bowl assembly having physical barriers which permit the use also of moat obstacles.

SUMMARY OF THE INVENTION

These and other objects of the invention are achieved in a bowl assembly which disposes the food area above the ground or floor. A supporting structure provides a sole pathway leading from the ground toward the rim of the bowl. A physical obstacle wall extends downwardly from the rim and cooperates with the side wall of the bowl to provide a multiple-tactic barriers, sterokinetic barriers, an elevation topographic barrier, and an olfactory barrier. The obstacle wall serves to shadow the pathway leading into the barrier with respect to light rays for providing the phototactic barrier to the crawling insects. The obstacle wall provides a geotactic barrier by presenting a side wall and an obstacle wall with numerous identical elevations. The obstacle wall and the side wall provide a thigmotactic barrier by presenting orthogonal walls in a pathway traveled by the insect. An elevation topographic barrier is presented by reducing the distance-to-ground of the obstacle wall to correspond to the type of insect to be precluded. Also, the obstacle is disposed in relatively close relation to the wall providing an enclosed barrier area facing relative to food scent for directing the insect out of the barrier along its entry path to prevent the insect from continuing the food search within the barrier.

BRIEF DESCRIPTION OF THE DRAWINGS

FIG. 3 is a perspective view of a second preferred embodiment of an animal feeding dish of FIG. 1 secured to a stand.

FIG. 4 is a persective view of the stand of the feeding dish of FIG. 3.

DETAILED DESCRIPTION OF THE PREFERRED EMBODIMENT

Figure 1:
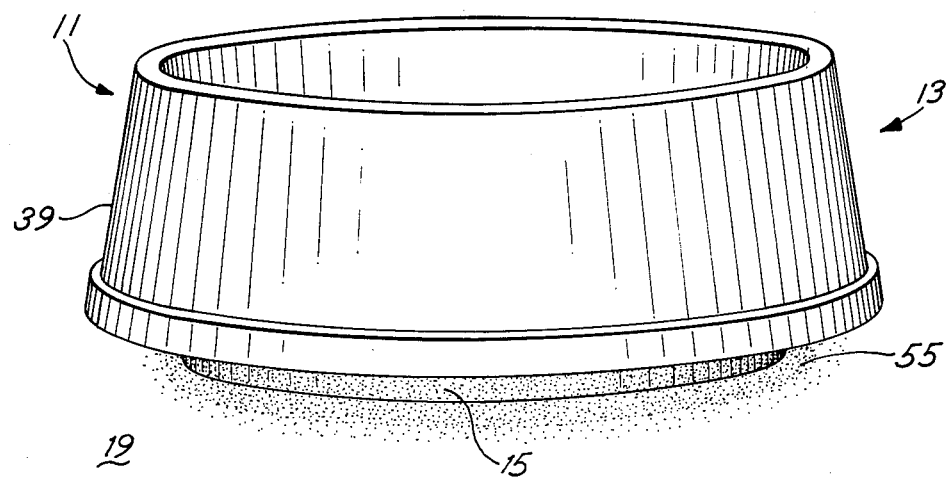
FIG. 1 is a perspective view of the preferred embodiment of an animal feeding dish of the present invention.
Figure 2:
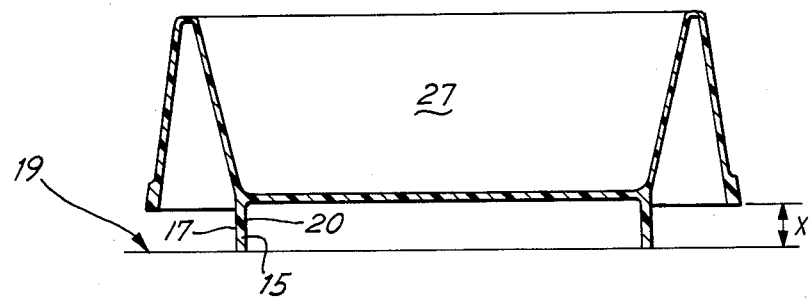
FIG. 2 is a cross-sectional side-view of the animal feeding dish of FIG. 1.

Referring to FIG. 1, an animal feeding dish or device 11 includes a generally circular shaped bowl assembly 13 disposed above the ground or floor surface 19 by a base support member 15. As shown in FIG. 2, base support member 15 is generally cylindrical in shape and supports the bowl area 27 above the ground or floor. An outer surface 17 of the support member provides a sole pathway for a crawling insect to reach the bowl assembly from the ground.

The embodiment of FIGS. 1 and 2 is a preferred form of the invention and serves as a Standard Model for production. However, a second embodiment of the invention includes the Standard Model attached to a stand. As shown in FIG. 3, the animal feeding dish 11 with its support member 15 may be attached to a stand member 16 which fans out beneath the bowl assembly. stand member 16, as shown in FIG. 4, includes a flat circular member 18 having an outside diameter which is larger than the outer diameter of bowl assembly 13.

The top service 17a of circular member 18 provides a pathway covering the ground beneath the bowl assembly and leads to pathway 17 of the support member 15. The two pathways 17, 17a are contiguous providing a sole pathway for a crawling insect to reach bowl area 27 when the circular member 18 is attached.

Stand member 16 includes a continuous circular lip or ring 21 which is centrally located on pathway 17a. As will suggest itself, a plurality of separate arcuate lips may be used instead of circular ring 21. Ring 21 provides an attachment area 23 at its outer side for frictionally engaging the inside surface 20 (FIG. 2) of support member 15 for attaching the stand to the feeding device 11. The attachment of the bowl assembly to the stand is shown in FIG. 5.

Figure 5:
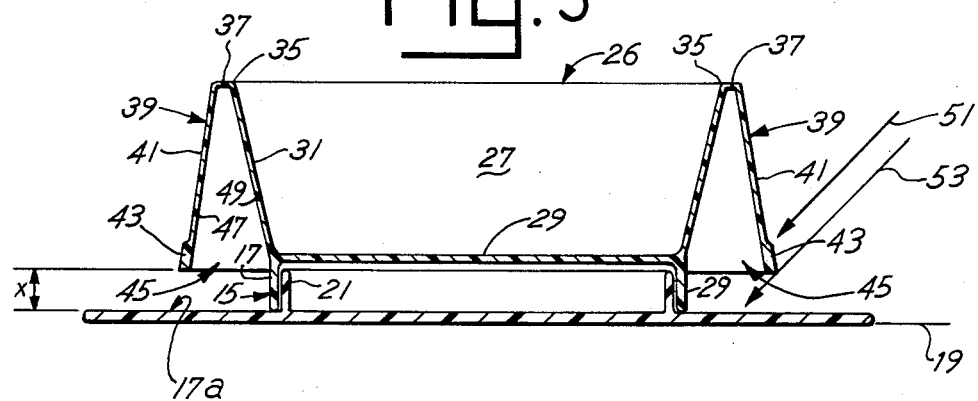
FIG. 5 is a cross-sectional side-view of the feeding dish of FIG. 3.

As shown in FIG. 5, bowl assemby 13 includes a bowl 26 defining bowl area 27 for containing animal water or food. Bowl 26 is formed of a circular bottom 29 and a frustumconically shaped side wall 31. Bottom 29 has a diameter substantially the same as support member 15 and is formed integrally therewith. Side wall 31 flares upwardly and outwardly from bottom 29 as shown.

Support member 15 attaches over ring 21 in order to secure the stand member relative to the bowl assembly. The support member 15 and ring 21 provide a frictional fit for attaching the stand member to the support member. Jostling, bumping, or the like, of the bowl assembly by the animal during feeding should not dislodge the bowl assembly from the stand member.

Bowl 26 includes an upper circular ridge 35 forming the circumference of the bowl and defining the sole entry location of crawling insects from the outside to the inside of bowl 26. An upper bowl lip 37 extends horizontally outwardly from circular ridge 35, as shown, forming the rim of the bowl assembly. Bowl lip 37 serves as a physical obstacle preventing insects from entering the bowl area by crossing over ridge 35 and into the bowl.

An outer obstacle wall 39 extends downwardly from the outer edge of bowl lip 37 and aesthetically forms the outer wall surface 41 of the bowl assembly. Surface 41 may include an offset portion 43 or other embossed or formed designs, for making the feeding device attractive. The distance "x" that the lower edge of wall 39 is above ground must be of a height sufficiently to prevent the insect from reaching the wall 39 directly from the pathway 17a or ground 19.

For example, German roaches account for a large majority of home infestations. German roaches approximate three-fourths of an inch in length. Therefore, the height of the outer edge of the bowl assembly should be established at ⅜" above the pathway 17a or ground 19 if German roaches are to be excluded. Where larger or smaller insects are to be expected in the particular environment, the height of the bottom edge of wall 39 above pathway 17a (or above ground 19), i.e, "x," may be adjusted upwardly or downwardly accordingly.

Outer obstacle wall 39 is a single-thickness member, frustumconically in shape, which is secured along the entire extent of the outer circular edge of bowl lip 37. Obstacle wall 39 includes an inside surface 47 confronting the outer surface 49 of bowl side wall 31. Lip 37 spaces the upper edge of obstacle wall 39 from the upper edge of bowl side wall 31. Obstacle wall 39 is angled outwardly with respect to the bowl wall for providing a more open area between the lower portions of the obstacle wall and bowl side wall, as shown.

Obstacle wall 39 cooperates with bowl side wall 31 to form a partially enclosed area or barrier 45 which prevents ants or crawling insects from entering bowl area 27. In order to reach the food area of the bowl, the insect must pass into barrier area 45 since the distance "x" is of a sufficient height to prevent the insect from physically reaching up to outer obstacle wall 39.

In use, the animal feeding device of FIG. 1 is placed on a hard flat surface or ground 9. Base support member 15 elevates bowl area 27 and thus elevates the outer obstacle wall 39 above ground to the height specified as "X" in FIGS. 2 and 5. This elevation of the bowl: (1) creates a mechanical barrier or maze which disturbs or disorients the insect's foraging activity; (2) increases the insect Area Restricted Search (ARS) time making homing orientation more time consuming for a forager that has reached the bowl area 27; (3) disrupts communication among insects during the organization phase of cooperative foraging; (4) creates an open space ("X") that exceeds the combined body and foreleg length of the insect which precludes the insects from "pulling themselves up" onto wall 39; (5) disrupts the trail phermones of insects (ants) that have reached bowl area 27, and have "jumped" from obstacle wall 39 to either ground 19 or pathway 17a.

Ants and other insects and other insects search for food in several modes: Area Restricted Search, olfaction, trail phermones, visual cues, and numerous sensoral modalities. Ants initially locate food by some combination of an Area Restricted Search, vision or odor mode in combination with a highly developed internal topographic map developed using multiple sensoral modalities. Once the food is discovered, a trail phermone is deposited by the successful forager as it returns to home (nest) and some portion of the colony follows the trail phermone to the food source. The mechanical barriers of the preferred embodiments disrupt and/or disorient the insect's foraging activities.

The mechanical barrier disrupts or disorients foraging activity in a multiplicity of ways. Insects (ants) have -tactic responses. A taxis is a reflex or orientation movement by insects (ants) in relation to a source of stimulation. Example taxes are Photo (light), Thigmo (contact, especially with a solid object), GEO (gravity), etc. Taxes may be used individually (one at a time), concurrently (more than one at a time), serially (one after another), and most taxes may be either positive or negative. Insects (ants) may switch taxes rapidly and they may switch from positive to negative, or vice versa rapidly. The use of taxes by insects may vary with either or both the environmental states and/or current states of the insect (ant). Given this, obstacle wall 39 shades the outer surface 49 of the bowl wall 31 and the support member 15 from light rays, as represented by light rays 51, 53 (FIG. 5). As shown in FIGS. 1 and 3, a shadow 55 appears on base support member 15 beneath the obstacle wall 39 of the bowl assembly. The intensity of light within the barrier area 45 is lower than the intensity of light outside of the barrier area due to the shading of light by wall 39.

If an insect is currently utilizing only its positive phototactic response mode, that is, it prefers to move toward light rather than away from light, then as the insect moves along either ground 19 or the pathway 17a of the stand it moves into the shadow cast by obstacle wall 39. The shadow deters the ant from entering barrier area 45 between the obstacle wall and the bowl side wall. As the insect begins to climb the outer surface or pathway 17 of the support member 15 to enter the barrier area 45, the insect approaches a progressively darker area within barrier area 45. The insect's response tendency is to make a positive phototactic choice and exit barrier area 45 back towards light.

If the ant does not retreat back down outer surface 17, the insect will climb the outer surface 49 of the bowl side wall 31 towards ridge 35. When the insect reaches the upper bowl lip 37, it places itself in a position where all choices of further movement are negatively phototactic. The insect would therefore most likely return along its original direction back over surface 49 of the bowl side wall and thereby exit the device.

If an insect is in either a negative phototactic response mode or alternating between positive and negative phototactic response modes, barrier area 45 would disorient or disrupt foraging activity. If the insect is concurrently or serially utilizing other tactic response modes, the disorientation/disruption would become more severe. For example, if the food source was initialy located through olfactory senses, the insect would utilize, among others, the geotactic response mode to establish an elevation topographic reference point. If the insect was concurrently operating in a negative thigmotactic response mode, it would not climb surface 17 of support member 15 when it was encountered. If it switched to a positive thigmotactic response mode it would climb surface 17 of support member 15. As it climbed surface 17, the olfactory responses would diminish as it entered barrier area 45. Since it was previously operating either concurrently or serially in a geotactic response mode, it would receive conflicting stimuli. That is, the olfactory modality indicatedd the presence of a food supply. As the insect climbed surface 17 to approach area which the olfactory senses identified, the geotactic response mode would provide positive reinforcement, while the olfactory modality would provide negative reinforcement. The result would be disorientation of the insect. The insect would then switch among -tactic responses to provide clarification. For example it could switch to positive and/or negative phototactic response modes. If it were positive and switched to a negative phototactic response, it would again become disoriented when it reached lip 37 when all choices of movement would be phototactically positive. If it switched to a positive phototactic response mode at that point, both choices would be equally acceptable. Since it had not discovered the food source at the apex of its geotactic response, it would most likely return from its original direction back down surface 49. Barrier area 45 effectively serves to disorient the insect's combined sensoral modalities and -tactic responses.

Stereokinisis is an undirected movement which occurs when an insect encounters an orthogonal surface such as support member 15 or the underside of ridge 35. Specifically the response mode of the insect when it encounters a circular surface which is orthogonal to its direction of movement chooses to follow the circular surface rather than climb the route of the vertical wall. The stereokinetic effect in conjunction with the disruption of the -tactic response modes produces disorientation in the insect.

The preceding illustration may be expanded to the extent of the statistical permutations of the combined sensoral modalities, -tactic responses and stereokinetic movements of the insect.

A search mode utilized by insects (ants) is Area Restricted Search (ARS). Several methods of foraging activity exist within ARS, however, the design of the embodiment has the same effect on all forms of ARS. The effect is that it increases search time through the use of surfaces 17, 49, lip 37 and surface 47 as opposed to a single exterior wall in a conventional feeding device. The distance traveled in foraging activity is approximately three times further in the described embodiment. The increased ARS time makes homing orientation for the insect (ant) more time consuming which puts it at a comparative time disadvantage with competing foragers.

In addition to the ARS time disadvantage created by the embodiment, a forager that does discover the food source has a second disadvantage. When the food source is discovered, the insect (ant) begins deposition of a trail pheromone which is volatile. Trail phermones are a specific scent ants use as a communication mthod to indicate the presence of a food source to the colony which subsequently follows the trail. Because of the increased time required for homing due to surfaces 17, 49, lip 37 and surface 47, the volatile characteristic of the deposited trail phermones will produce three effects: a weaker odor (trail pheromone) signifying an unimportant food source; no odor (pheromone) indicating no food source; and/or a trail pheromone that, when compared with the trail phermones of other foragers which have discovered a food source at approximately the same time, is comparatively uninteresting with respect to locating a food source. Disruption of the communication process described above during the organization phase of cooperative foraging is known to be very dysfunctional to successfully utilizing a food source. The organization phase refers to the recruiting of harvesters by the foragers.

FIGS. 2 and 5 indicate the variable distance "X" above either ground 19 or pathway 17a. This distance prevents crawling insects from "pulling themselves up" onto outer surface 41. The distance must be greater than the combined length of both the forelegs and the body length (from the tip of the mandibles to the tip of the gaster) of the insect (ant).

Insects (ants) may reach bowl area 27 either by having a size exceeding distance "X" or by successfully traversing surfaces 17, 49, lip 37 and surfaces 47, 41. If bowl area 27 is reached the insect (ant) will begin to deposit a trail pheromone on surface 41 of outer obstacle wall 39 as it leaves the food area. When the insect reaches the offset portion 43, it will probably elect to "jump" to either ground 19 or pathway 17a. In that event, the trail pheromone will not be continuous. The forager will return to home (nest) and a portion of the colony will follow the trail pheromone to the point of discontinuity. The insects (ants) access to the food source will be precluded because a continuous trail pheromone does not exist.

Since insects may use air-borne scent to discover food, once the insect is within barrier area 45 between the obstacle wall and bowl side wall, scent from the food no longer provides direction. The scent would apper to the insect to be coming from the ground level. The scent travels around obstacle wall 39 and enters the barrier area from ground level. This directs the insect to return to the stand pathway 17a to exit barrier area 45 rather than continuing the food search within the barrier area.

To provide a further barrier, if desired, insect poison or repellant may be placed on either or both of the inside surfaces 47, 49 of the barrier area. The poison and/or repellant may be of several types: spray, liquid, gel, or adhesive.

Figure 6:
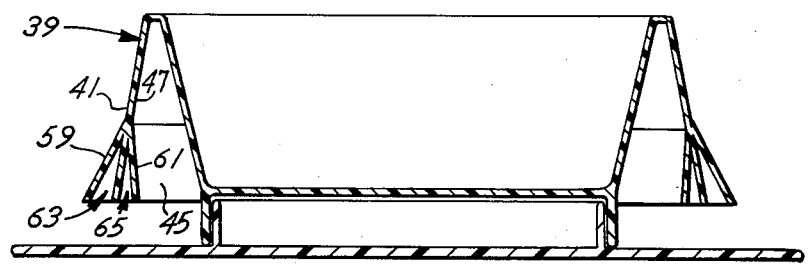
FIG. 6 is a cross-sectional side-view of another embodiment of an animal feeding dish.

Referring to FIG. 6, another embodiment is illustrated in which additional physical obstacles 59, 61 may be secured to the outer surface 41 and inside surface 47, respectively, of obstacle wall 39. The additional obstacles 59, 61 are frustumconical in shape and cooperate with obstacle wall 39 in order to provide additional barrier areas 63, 65 for providing additional phototaxic and scent barriers operating in a similar fashion as barrier area 45.

Figure 7:
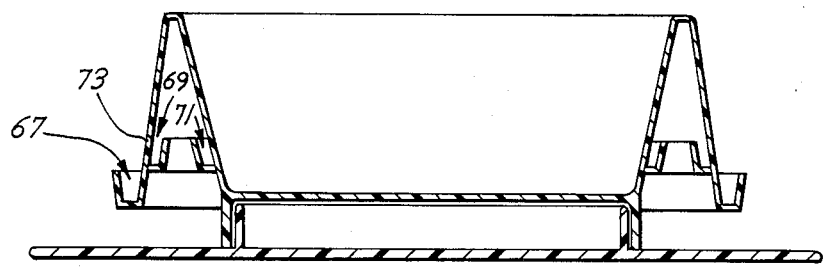
FIG. 7 is is a cross-secional side-view of another embodiment of an animal feeding dish.

Referring to FIG. 7, another embodiment is illustrated in which moats 67, 69 and 71 may be constructed along the side wall and obstacle wall as shown. The moats may be filled with any form of liquid, spray, or gel insecticide. An exterior port 73 may be utilized to fill moats 69, 71.

The embodiment of FIG. 1 must be used on a hard surface, whereas the stand pathway design of FIG. 3 permits use of the feeding device on uneven surfaces, e.g., grass, dirt, gravel, etc. The stand member of the embodiment of FIG. 3 prevents the animal from pushing the feeding device against any object that would by-pass the barrier. An example would be a dog pushing the feeding device against a wall, tree or grass and thereby permitting the insect to climb up the wall (tree, blade of grass, etc.) and circumvent the barrier.

The stand member of FIG. 4 acts as a further barrier with respect to ants or insects which burrow from beneath the feeding device. Such burrowing insects cannot emerge from the ground directly under the barrier area as is possible with embodiment of FIG. 1. The barrier area is more effective in the embodiment of FIG. 3 where the burrowing insect emerges outside of the stand member 16, and not under the barrier area, since the stand member has a larger diameter than the diameter of the bowl assembly. It is believed that this occurs because the insect emerges from a dark area (underground) and proceeds into the dark area of the barrier of embodiment in FIG. 1. However, with the embodiment of FIG. 3, the insect emerges into conditions which cause the insect's various -tactic responses and stereokinetic movements to disturb or disorient the insect's foraging activity (as previously described).

The method described above interferes with an insect's navigation and orientation systems in such a manner as to prevent it from reaching a food source. This same method of preventing insects from reaching a food source may be used in forms other than to prevent insects from reaching the food source of a pet feeding dish. For example, insects may be excluded from buildings, homes, etc. within which food sources may be found.

It is to be understood, of course, that the foregoing describes different embodiments of the present invention and that modifications may be made therein without departing from the spirit or scope of the present invention as set forth in the appended claims.

What is claimed is:

1. A method for preventing insects of a predetermined size from reaching a source of food from ground comprising:

determining the maximum size of the insect to be prevented from reaching the source of food;

providing a first pathway extending upwardly from ground from a locus of a continuous shape for a crawling insect to reach the food source from ground;

providing a physical barrier at an entry point on the first pathway to the food source including providing a second pathway leading away from the food source to an end point having an elevation topographic reference different from the elevation topographic reference of the food source, said step of providing a second pathway including:

adjusting the distance that the end point is spaced from ground in accordance with the insect size determined in said step of determining to prevent crawling insects from climbing onto said second pathway from ground;

generating both multiple-tactic barriers and stereokinetic barriers along the first pathway beginning at an intermediate point on the first pathway and extending to the entry point to the food source; and wherein said multiple-tactic barriers and said stereokinetic barriers extend along the second pathway toward its endpoint; and positioning said first and second pathways relative to the food source including providing a scent barrier to restrain the insects from traveling along the first pathway to the entry point to the food source.

2. An animal feeding bowl for placement on the ground and which prevent a crawling insect of a predetermined size from reaching the food area of the bowl, comprising:

bowl means defining a bowl area capable of holding animal food, said bowl means having an upper ridge defining the sole entry location for crawling insects into the bowl area;

supporting means for supporting said bowl means with respect to the ground for disposing said upper ridge at an elevation located above ground;

a first surface positioned with respect to said support means for defining a first pathway for a crawling insect to reach food in the bowl area from ground, said first surface extending upwardly from ground from a locus of a continuous shape for providing said first pathway disposed in a direction leading away from ground toward the bowl area for discouraging the climbing of the insect onto said first pathway when the insect is using -tactic response modes either individually, concurrently or serially;

obstacle means secured along the entire extent of said ridge and including a surface bearing member depending towards the ground and being spaced from ground by a predetermined distance, said distance being greater than said predetermined size of the insect so as to prevent the crawling insect from climbing onto said surface bearing member from ground, said surface bearing member physically blocking insects from passing from said first pathway across said ridge into said bowl area, said surface bearing member bearaing a second surface defining a second pathway being disposed in a direction leading from said first pathway toward ground to a point having an elevation different than the elevation of said ridge for discouraging continued movement by an insect along said second pathway toward ground when the insect is using -tactic response modes either individually, concurrently or serially, said obstacle means cooperating with said first surface for generating a phototactic barrier along said first pathway by shadowing thereof to discourage continued movement by the insect along said first pathway toward said bowl area when the insect is in a positive phototactic response mode, said obstcle means being disposed relative to said first surface for generating a geotactic barrier to disorient the insect's foraging for a food source at a particular elevation, said first and second pathways being disposed relative to the direction of food scent from food in the bowl area for discouraging the insect from movement along said first pathway toward said bowl area.

3. An animal feeding bowl according to claim 2 wherein said surface bearing member includes a frustumconical member depending from said ridge toward ground with increasing diameter.

4. An animal feeding bowl according to claim 2 wherein said bowl means includes a third surface which defines the sides of the bowl area.

5. An animal feeding bowl according to claim 4 wherein said bowl means is formed from said third surface and a circular base.

6. An animal feeding bowl according to claim 2 and further including second obstacle means having a second surface depending toward ground and being spaced from said first named surface for forming a second barrier area for providing multiple-tactic barriers.

7. An animal feeding bowl according to claim 2 wherein said first surface includes a first surface portion which is orthogonal to the ground and a second surface portion which is frustumconical in shape.

8. An animal feeding bowl according to claim 2 wherein said supporting means is formed integrally with said circular base.

9. An animal feeding bowl according to claim 2 wherein said continuous shape is a circle.

* * * * *